US008028074B2

(12) United States Patent
Allen

(10) Patent No.: US 8,028,074 B2
(45) Date of Patent: Sep. 27, 2011

(54) OBTAINING INFORMATION ASSOCIATED WITH ESTABLISHED SESSIONS

(75) Inventor: Andrew Allen, Mundelein, IL (US)

(73) Assignee: Research In Motion Limited, Waterlook, Ontario (CA)

( * ) Notice: Subject to any disclaimer, the term of this patent is extended or adjusted under 35 U.S.C. 154(b) by 155 days.

(21) Appl. No.: 12/209,900

(22) Filed: Sep. 12, 2008

(65) Prior Publication Data

US 2010/0070641 A1 Mar. 18, 2010

(51) Int. Cl.
*G06F 15/16* (2006.01)
(52) U.S. Cl. ...... 709/227; 370/254; 370/351; 455/435.1
(58) Field of Classification Search .................. 709/203, 709/219, 223; 370/328, 338, 254, 392
See application file for complete search history.

(56) References Cited

U.S. PATENT DOCUMENTS

| 7,283,506 B2 * | 10/2007 | Mayer et al. ................. 370/338 |
| 2004/0139198 A1 * | 7/2004 | Costa-Requena et al. .... 709/227 |
| 2006/0080428 A1 * | 4/2006 | Trossen et al. ................ 709/224 |
| 2009/0063649 A1 * | 3/2009 | Yamagishi ..................... 709/207 |
| 2009/0213761 A1 * | 8/2009 | Lai ................................ 370/254 |
| 2009/0257433 A1 * | 10/2009 | Mutikainen et al. .......... 370/392 |
| 2009/0319666 A1 * | 12/2009 | Liang et al. .................... 709/227 |

OTHER PUBLICATIONS

3GPP TS 24.259 V1.0.0; 3rd Generation Partnership Project; Technical Specification Group Core Network and Terminals; Personal Network Management (PNM); Stage 3 (Release 8); May 2008; 52 pgs.
Rosenberg, J.; "Obtaining and Using Globally Routable User Agent (UA) URIs (GRUU) in the Session Initiation Protocol (SIP)"; draft-ietf-sip-gruu-15; Oct. 11, 2007; 37 pgs.
Open Mobile Alliance; Dictionary for OMA Specifications; Approved Version 2.6; OMA-ORG-Dictionary-V2_6-20070614-A; Jun. 14, 2007; 21 pgs.
Rosenberg, J.; "The Extensible Markup Language (XML) Configuration Access Protocol (XCAP)"; Network Working Group; RFC 4825; May 2007; 71 pgs.
Khartabil, H., et al.; "Functional Description of Event Notification Filtering"; Network Working Group; RFC 4660; Sep. 2006; 28 pgs.
Khartabil, H., et al.; "An Extensible Markup Language (XML)—Based Format for Event Notification Filtering"; Network Working Group; RFC 4661; Sep. 2006; 22 pgs.
Lonnfors, M., et al.; "Session Initiation Protocol (SIP) Extension for Partial Notification of Presence Information"; draft-ieft-simple-partial-notify-08; Simple WG; Jul. 6, 2006; 14 pgs.
Rosenberg, J., et al.; "An INVITE-Initiated Dialog Event Package for the Session Initiation Protocol (SIP)"; Network Working Group; RFC 4235; Nov. 2005; 39 pgs.

(Continued)

*Primary Examiner* — Dustin Nguyen
(74) *Attorney, Agent, or Firm* — Conley Rose, P.C.; J. Robert Brown, Jr.

(57) ABSTRACT

A user agent (UA) is provided. The UA comprises a processor configured to send a message specifying a subset of a Session Initiation Protocol (SIP) Dialog-Info Event package that is to be returned to the UA. A method for a user agent (UA) to manage notifications related to session events is also provided. The method includes sending a message specifying a subset of Session Initiation Protocol (SIP) Dialog-Info Event package state information that is to be returned to the UA. The method also provides for receiving the subset of the SIP Dialog-Info Event package state information.

13 Claims, 5 Drawing Sheets

OTHER PUBLICATIONS

Rosenberg, J.; "A Session Initiation Protocol (SIP) Event Package for Registrations"; Network Working Group; RFC 3680; Mar. 2004; 24 pgs.

Roach, A. B.; "Session Initiation Protocol (SIP)—Specific Event Notification"; Network Working Group; RFC 3265; Jun. 2002; 38 pgs.

Rosenberg, J., et al.; "SIP: Session Initiation Protocol"; Network Working Group; RFC 3261; Jun. 2002; Part 1; 100 pgs.

Rosenberg, J., et al.; "SIP: Session Initiation Protocol"; Network Working Group; RFC 3261; Jun. 2002; Part 2; 100 pgs.

Rosenberg, J., et al.; "SIP: Session Initiation Protocol"; Network Working Group; RFC 3261; Jun. 2002; Part 3; 69 pgs.

PCT International Search Report; PCT Application No. PCT/US2008/076229; Aug. 5, 2009; 4 pgs.

PCT Written Opinion of the International Searching Authority; PCT Application No. PCT/US2008/076229; 7 pgs.

Olson, S; Title: Extensions to the Dialog Event Package for Third Party Call Control; SIPPING Internet-Draft: draft-olson-sipping-dialog-package-extensions-00; Jun. 22, 2003; 20 pgs.

Rosenberg; J., et al.; Title: An INVITE Initiated Dialog Event Package for the Session Initiation Protocol (SIP); SIPPING WG Internet-Draft: draft-ietf-sipping-dialog-package-01.txt; Internet Engineering Task Force; Mar. 1, 2003; 26 pgs.

PCT International Preliminary Report on Patentability; PCT Application No. PCT/US2008/076229; Oct. 16, 2010; 16 pages.

Rosenberg, J., et al., "Indicating User Agent Capabilities in the Session Initiation Protocol (SIP)," Network Working Group, RFC 3840; Aug. 2004; 36 Pages.

* cited by examiner

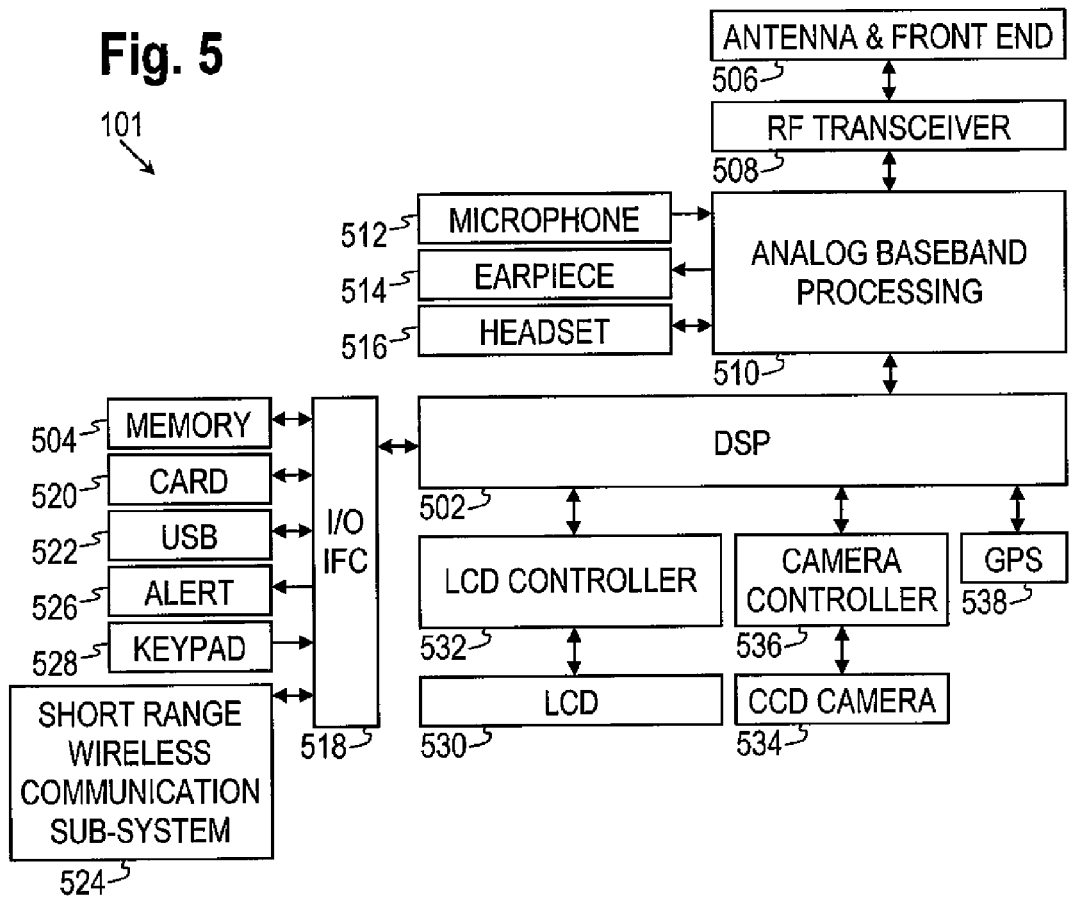
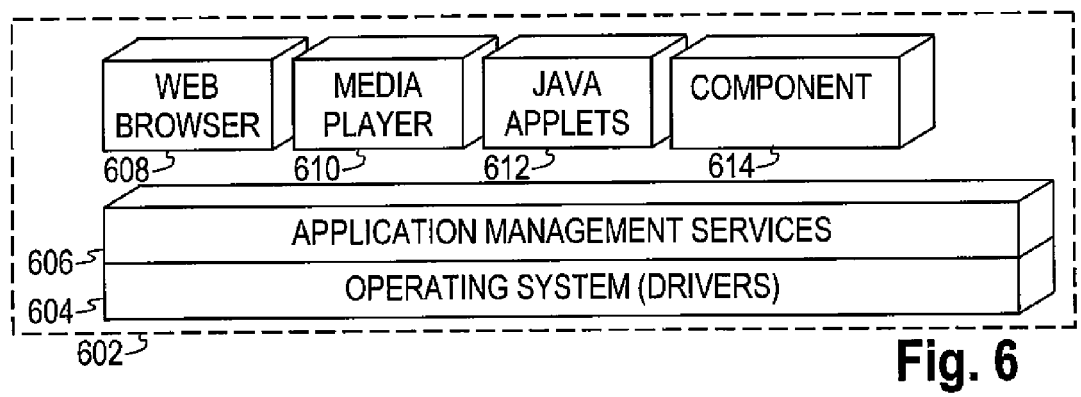

OBTAINING INFORMATION ASSOCIATED WITH ESTABLISHED SESSIONS

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device. The term "UA" may also refer to devices that have similar capabilities but that are not transportable, such as fixed line telephones, desktop computers, set-top boxes, or network nodes. When a UA is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a block diagram of a user agent operable for some of the various embodiments of the disclosure.

FIG. 6 is a diagram of a software environment that may be implemented on a user agent operable for some of the various embodiments of the disclosure.

DETAILED DESCRIPTION

Figure 1:
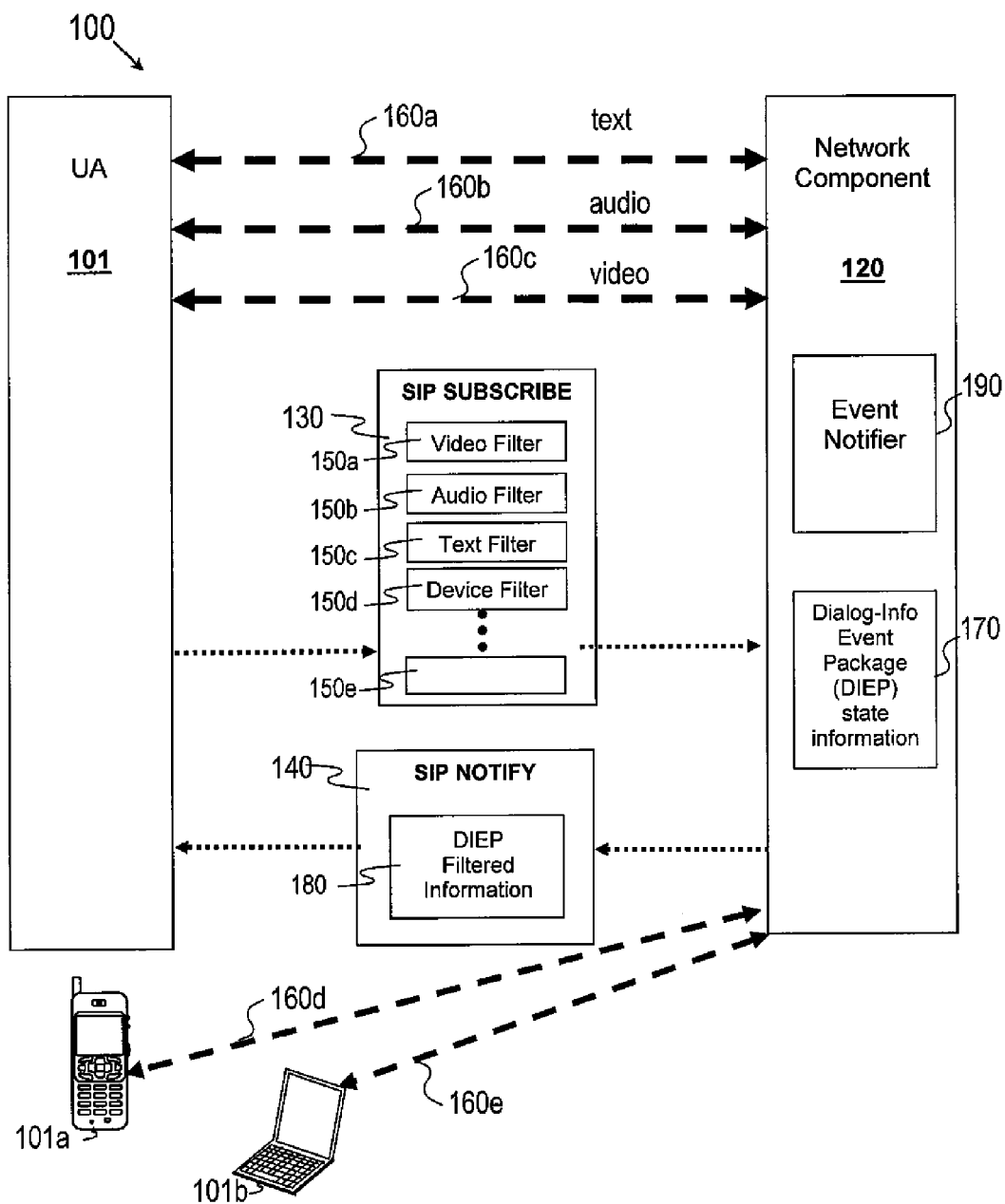
FIG. 1 is an illustration of a wireless telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user agent (UA) is provided. The UA includes a processor configured to send a message specifying a subset of Session Initiation Protocol (SIP) Dialog-info Event package state information that is to be returned to the UA.

In an alternative embodiment, a method for a user agent (UA) to manage notifications related to session events is provided. The method includes sending a message specifying a subset of Session Initiation Protocol (SIP) Dialog-Info Event package state information that is to be returned to the UA. The method further includes receiving the subset of the SIP Dialog-Info Event package state information.

In an alternative embodiment, a network component is provided. The network component includes a processor configured to receive a first message specifying a subset of Session Initiation Protocol (SIP) Dialog-Info Event package state information, and further configured to transmit a second message that includes the subset of the SIP Dialog-Info Event package state information.

In an alternative embodiment, a method for a network component to manage notifications related to session events is provided. The method includes receiving a first message specifying subset of Session Initiation Protocol (SIP) Dialog-Info Event package state information. The method also includes transmitting a second message that includes the subset of the SIP Dialog-info Event package state information.

A public user identity or an Address of Record (AoR) in the format of a uniform resource identifier (URI) can provide a single identifier for multiple user agents (UAs). For example, a single user might have a mobile telephone, a laptop computer, and a home computer that are registered with the same Public User Identity/AoR. When a message is sent to the URI of the Public User Identity/AoR, the message may be duplicated and directed to multiple UAs either serially or in parallel, which is known as forking. In some cases, it might be desirable for a message to be directed to only one of the UAs that share a single Public User Identity/AoR URI. To provide such a capability, a feature known as a GRUU (Globally Routable User Agent URI) can allow a message to be directed to a specific UA. If each of the UAs has a unique GRUU, the message can be routed accordingly.

A connection or "session" may be established between one or more of the UAs sharing the same public user identity or AoR and one or more other UAs and can also involve a network component, such as a server. The network component can generate or retrieve state information related to the characteristics of the dialog/session and events that occur during the session, which can include new media types being added, existing media types being changed, and other events. In addition, when a user has multiple UAs registered and bound to the same user identity (such as a SIP URI or telephone number) it may be useful for the user to be able to receive information about which UAs are registered with that identity and what their capabilities are (especially media handling capabilities) and information about the current sessions the UA is involved in and the media types associated with these sessions. It may be particularly useful to receive a notification when a new media type is added to a session on another UA as a result of a transfer of a session to that UA. This allows the user of each UA to keep track of the sessions they currently have ongoing with other UAs.

A Dialog-Info Event Package is defined in Internet Engineering Task Force (IETF) Request for Comments (RFC) 4235 and provides an encoding/format to represent this event state information. The Dialog-Info Event Package state information can be placed in a notification message that is sent to the URI of at least one of the UAs that is involved in the session. This allows a user to obtain information about a SIP dialog, including the capabilities of the other UAs and what media types are involved in the sessions.

When multiple UAs have registered with the same Public User Identity/AoR URI and each UA subscribes with the network server to the Dialog-Info Event Package state information, then each UA receives the notifications every time an event occurs. Currently, subscriptions to the Dialog-Info Event Package state information result in notifications being sent for every event change, including transient intermediate events (such as during session setup or during modifications to a session). This can result in redundant notifications and redundant information in the notifications. Receiving notifications of events that are of no interest to the UA can cause the UA to become overloaded with unnecessary notifications. Not only can this consume battery resources, the communication system can become burdened, resulting in a need for more network resources and radio resources to handle the increased traffic. This can result in a higher cost of services.

In an embodiment, a mechanism to effectively manage the notifications is provided. Current systems do not readily allow for the UA to configure notifications associated with specified devices and/or media types. The present system enables a UA to be able to obtain information about each of the multiple UAs registered with the Public User Identity/AoR URI, which may include, but is not limited to, the UA identity, the UA capability, current active and inactive sessions of each of the UAs, and the type of media being processed by the UA during active sessions. A mechanism that selectively determines notifications to be sent to the subscribing UA and filters the notifications based upon desired media types, media capabilities of various UAs, upcoming or current sessions for the URI, and stable dialog/session states can significantly reduce the size and the number of notification messages being sent to each of the UAs.

Turning now to FIG. 1, illustrated is an embodiment of a communication system 100. FIG. 1 is exemplary and may have other components or arrangements in other embodiments. User agents (UA) 101, 101a, and 101b each have Session Initiation Protocol (SIP) capabilities and/or other current or future technologies. Internet protocols (IP) IPV4, IPV6, and/or other current or future protocols may be supported by these technologies. The UAs 101 may be serviced by any or a combination of Internet Protocol-based networks, packet-based networks, public switched telecom networks (PSTN), and/or integrated services digital networks. The UAs 101, 101a, and 101b may each be associated with the same Public User Identity/AoR URI and may be engaged in a plurality of communication sessions 160 with a network component 120. The sessions 160 may include a SIP-based phone call and/or exchange of various multimedia, text, audio, and/or video on each.

The network component 120 may be, may include, or may be included in a server and/or a plurality of other similar network components. Although depicted as a single component, the network component 120 may be any combination of components and/or networks that can act as intermediaries in a communication session between the UA 101 and another UA.

In an embodiment, Dialog-Info Event Package (DIEP) state information 170 may be generated by, stored in, or otherwise accessible to the network component 120. An event notifier 190 might also reside in or be accessible to the network component 120. The event notifier 190 can process messages from the UA 101 regarding the number and content of notifications that the UA 101 wishes to receive and, in response to the messages, can promote sending the UA 101 only the portions of the DIEP state information 170 that the UA 101 wishes to receive. The event notifier 190 does not necessarily reside on a network component that is involved in the sessions 160.

Prior to and during the sessions 160, the UA 101 and the network component 120 may exchange SIP requests and responses. In some instances, the SIP requests might be a SIP SUBSCRIBE message 130 and a SIP NOTIFY message 140 operable for providing subscription to and notification of session events, and the UA 101 will receive notifications of events. The SIP NOTIFY message 140 might also be sent in response to the SIP SUBSCRIBE message 130. The SIP messages 130 and 140 might include one or more sets of filters to apply to notifications or subscriptions amongst the UAs 101 and the network component 120. In some embodiments, the filters might include one or more extensible markup language (XML) elements and/or may include instructions rendered in other languages. It is to be understood that the messages 130 and 140 may be messages other than SIP SUBSCRIBE and SIP NOTIFY messages.

In an embodiment, the SIP SUBSCRIBE message 130 includes one or more filters 150a-e that include expressions that might be, for example, XML elements that are operable for filtering one or more of the notifications. For example, the filters 150a-e may be configured to filter notifications related to media types including text, audio, and/or video available to one or more of the UAs 101.

Although the filters 150a-e as shown in FIG. 1 may be related to media types, in some instances the filters 150a-e may not be related to media types. For example, the filters 150a-e may be operable to filter notifications related to the one or more of the UAs 101, and therefore may be related to specific GRUUs. In other instances, the filters 150a-e may be associated with the network component 120 or other entities of the system. In other instances the filters 150a-e may be related to the states of a dialog/session so that notifications of transient state changes of no interest are prevented. In an alternative embodiment, filters 150a-e may be a set of rules, instructions, parameters, logic or the like, implemented as hardware or software, which may be executed by, on, or provided by the device, network, or elsewhere that are used to determine the information to provide as disclosed herein. In these other embodiments for example, the filters 150a-e may be parameters identifying information that the UA 101 is interested obtaining, such as provided in the SIP SUBSCRIBE message 130, that are use by the UA 101 or other components in the network to provide, as well as limit and restrict, but otherwise promote deliver of only the desired notifications.

For purposes of clarification, there may be instances where the UA 101a may not desire to be notified of a video stream going to the UA 101b. Likewise, there may be circumstances where the UA 101b may not desire to be notified of an incoming messaging session to the UA 101a. In another example, the UA 101a may not desire to receive a notification of video calls placed to the UA 101b. The UA 101a could submit the filter 150a along with the GRUU of UA 101b in the SIP SUBSCRIBE message 130 to the network component 120 to obtain a filtered version of the DIEP state information 170 that does not include these and other notifications, such as notifications of video calls placed to the UA 101b. In another example, the UA 101*a* could submit the filters 150*a-e* along with the GRUU of UA 101*b* in the SIP SUBSCRIBE message 130 to the network component 120 to obtain a filtered version of the DIEP state information 170 such that no notifications are sent to the UA 101*b* regardless of the media types. In another example, the UA 101 could submit the filters 150*a-e* such that notifications related to only certain session states are transmitted. For instance, multiple notifications might be generated whenever a session state changes, but the UA 101 might be interested only in the "confirmed" state. The UA 101 could submit one of the filters 150 to indicate that only "confirmed" session state notifications are to be sent. In another example, the UA 101 could submit the filters 150*a-e* to specify one or more of the other UAs 101*a* and 101*b* about which the UA 101 wishes to receive notifications. In this manner, a GRUU along with one or more of the filters 150*a-e* can cause notifications associated with various media types, GRUUs, and sessions 160 to be directed only to specified devices. In addition, only notifications for the desired dialog states (such as "confirmed" state) might be received.

The following is an example of the filters 150*a-e* that may be used in the SIP SUBSCRIBE message 130 configured to request notifications when a video or audio media type is added, when a new session is added containing a video or audio media type, or when video or audio media types change. An example of when media type changes might include the notification to the UA 101*a* of a video stream going to the UA 101*b*. It is to be understood that the following example of the filters 150*a-e* may include a plurality of filters or may include a single filter. The example includes the filters 150*a-e* in the SIP SUBSCRIBE message 130 request body that might be used to obtain the SIP NOTIFY message 140 related to one of the UAs 101 with, for example, the GRUU sip:alice@example.com;gr=urn:uuid:f81d4fae-7dec-11d0-a765-00a0c91e6bf6 when a media type of one or more of the sessions 160 is changed, modified or added.

```
<?xml version="1.0" encoding="UTF-8"?>
<filter-set xmlns="urn:ietf:params:xml:ns:simple-filter">
  <ns-bindings>
    <ns-binding prefix="tns"
         urn="urn:ietf:params:xml:ns:dialog-info"/>
  </ns-bindings>
  <filter id="123" uri="sip:alice@example.com;gr=urn:uuid:f8
1d4fae-7dec-11d0-a765-00a0c91e6bf6">
    <what>
      <include>
        /tns:dialog-inf /tns:dialog/tns:local/tns:session-
        description[@type="video"
        or @type="audio"]
      </include>
    </what>
    <trigger>
      <changed>
        /tns:dialog-inf /tns:dialog/tns:local/tns:session-description
      </changed>
    </trigger>
    <trigger>
      <added>
        /tns:dialog-inf /tns:dialog/tns:local/tns:session-description
      </added>
    </trigger>
    <trigger>
      <removed>
        /tns:dialog-inf /tns:dialog/tns:local/tns:session-description
      </removed>
    </trigger>
  </filter>
</filter-set>
```

The event notifier 190 may apply the filters 150*a-e* to the DIEP state information 170 to create filtered DIEP state information 180 that is to be included in the SIP NOTIFY message 140. The filtered DIEP state information 180 may be formed by applying one or more filters 150*a-e* to the DIEP state information 170 to specify the state information that is desired. In some cases, the filters 150*a-e* cause only the desired state information to be generated. In other cases, additional state information might be generated, but the filters 150*a-e* cause only the desired state information to be included in the SIP NOTIFY message 140. In this manner, the event notifier 190 may be directed by the UA 101 to provide selected information in the filtered DIEP state information 180 as part of the content of the NOTIFY message 140.

The following is an example of the SIP NOTIFY message 140 that would be sent to the UAs 101 without the filters 150*a-e*. The example includes a sample notification body ("Full State") of the SIP NOTIFY message 140 that might be a result when a video media type is in the SIP NOTIFY message 140.

```
<?xml version="1.0" encoding="UTF-8"?>
<dialog-info xmlns="urn:ietf:params:xml:ns:dialog-info"
    xmlns:xsi="http://www.w3.org/2001/XMLSchema-instance"
    xsi:schemaLocation="urn:ietf:params:xml:ns:dialog-info"
    version="1" state="full">
  <dialog id="123456">
    <state>confirmed</state>
    <duration>274</duration>
    <local>
      <identity display="Alice">sip:alice@example.com</identity>
      <target uri="sip:alice@example.com;gr=urn:uuid:f81d4fae-7dec-
11d0-a765-00a0c91e6bf6">
        <param pname="instance" pval="urn:uuid:f81d4fae-7dec-11d0-
a765-00a0c91e6bf6"/>
        <param pname="audio" pval="true"/>
        <param pname="video" pval="true"/>
      </target>
      <session-description type="audio">
      <session-description type="video">
    </local>
    <remote>
      <identity display="Bob">sip:bob@example.org</identity>
      <target uri="sip:bob@phone21.example.org"/>
    </remote>
  </dialog>
</dialog-info>
```

The following is an example of the SIP NOTIFY message 140 that might be sent to the UAs 101 with the filters 150*a-e*. The example includes a sample notification body ("Partial State") of the SIP NOTIFY message 140 that might be a result when the video media type is in the SIP NOTIFY message 140, and when at least one of the filters 150*a-e* is specified in the SIP SUBSCRIBE message 130.

```
<?xml version="1.0" encoding="UTF-8"?>
<dialog-info xmlns="urn:ietf:params:xml:ns:dialog-info"
    xmlns:xsi="http://www.w3.org/2001/XMLSchema-instance"
    xsi:schemaLocation="urn:ietf:params:xml:ns:dialog-info"
    version="1" state="partial">
  <dialog id="123456">
    <state>confirmed</state>
    <local>
      <session-description type="audio">
      <session-description type="video">
    </local>
  </dialog>
</dialog-info>
```

As can be seen in the above examples, the filtered SIP NOTIFY message 140 body is significantly reduced in size from what it would have been without the filter. As previously discussed, the filters 150a-e may be included in the SIP SUBSCRIBE message 130 to filter media types. The SIP SUBSCRIBE message 130 may also be configured to request notifications when a new media type is added, when a new session is added, or when media types change.

Another embodiment contemplates the SIP SUBSCRIBE message 130 requesting information on the capabilities of the UAs 101, and one of the UAs 101 receiving notification of the capabilities The SIP NOTIFY message 140 may notify one of the UAs 101 if a particular media type can be handled by another one of the UAs 101. For instance, the UA 101a may be notified of the capabilities of the UA 101b. If the UA 101b has capabilities appropriate for handling a particular media type, for example streaming video, the UA 101a may request a transfer of a video feed from the session 160d over to the session 160e to the UA 101b.

In addition, the SIP SUBSCRIBE message 130 may be sent from the UA 101a to determine the media types currently on the UA 101b. If the UA 101a desires to transfer a video to UA 101b and UA 101b is already playing a video, the video on the UA 101a may not be transferred.

The following discussion includes example operations of the filters 150a-e from the perspective of the network component 120. In an embodiment, the network component 120 receives the SIP SUBSCRIBE message 130 to determine information to be included in one or more of the sessions 160. In some instances, the DIEP state information 170 may include one or more elements of information related to a state of one of the sessions 160 or an event that occurs in one of the sessions 160 that may be sent to one or more of the UAs 101. The DIEP state information 170 may store a set of instructions, expressions or XML elements that promote the extraction of information. The DIEP state information 170 may also have XML elements, instructions, or expressions that determine the event times for the information that may be sent to the UA 101a or 101b. The filters 150a-e in the SUBSCRIBE SIP message 130 allow one or more of the UAs 101 to obtain desired information from the network component 120 related to one or more of the other UAs 101. For example, the filters 150a-e may filter the DIEP state information 170 to promote sending video and audio media such as video conference streams or Internet Protocol (IP) TV to the UA 101b, while the UA 101a may receive notifications about text and audio media such as phone calls and or text messages. In this manner, one of the UAs 101a or 101b may receive desired information and notifications from the network component 120 based upon the device and resource capabilities of one of the other UAs 101a and 101b.

Alternatively, the filtered DIEP state information 180 may be used to route video and/or audio capabilities to any of the UA 101, which may have the same public user identity/AoR URIs. Since the UAs 101 may be associated with public user identity/AoR URIs that may include multiple associated devices, it is desirable to be able to customize the user experience for each of the UAs 101. In some embodiments, the session 160d and 160e may be interchanged between the UA 101a and 101b. For instance, the session 160d between the UA 101a and the network component 120 may include media types that may be transferred over to the UA 101b to the session 160e via a device capabilities request of the DIEP state information 170. For example, the session 160d may include a phone conversation during which a notification about a video stream arrives. A notification may be sent to alert the UA 101a of the video media type, and the UA 101a can send the SIP SUBSCRIBE message 130 asking for media capabilities and/or current media on the UA 101b. Using this information, the video stream might or might not be directed to the UA 101b either transparently or through direct intervention by the UA 101a and 101b, or by the URI or a GRUU associated with the UA 101a and 101b.

It is to be understood that the UA 101a may transfer either the concurrent voice call and/or the video stream over to the UA 101b. Alternatively, the UAs 101 could cause a transfer of the media types from UA 101a to UA 101b.

The following is an example of the filters 150a-e in the SIP SUBSCRIBE message 130 configured to obtain capabilities of one of the UAs 101. The example includes the filters 150a-e in the SIP SUBSCRIBE message 130 request body that can be used to obtain notifications from the network component 120 for one of the UAs 101 having, for example, the GRUU sip:alice@example.com;gr=urn:uuid:f81d4fae-7dec-11d0-a765-00a0c91e6bf6 containing just the media type capabilities of one of the UAs 101.

```
<?xml version="1.0" encoding="UTF-8"?>
<filter-set xmlns="urn:ietf:params:xml:ns:simple-filter">
    <ns-bindings>
        <ns-binding prefix="tns"
            urn="urn:ietf:params:xml:ns:dialog-info"/>
    </ns-bindings>
    <filter id="123" uri="sip:alice@example.com;gr=urn:uuid:f8
        1d4fae-7dec-11d0-a765-00a0c91e6bf6">
        <what>
            <include>
                tns:dialog-inf/tns:dialog/tns:local/tns:target/
                tns:param[@pname="video"
                or @pname="audio"]
            </include>
        </what>
    </filter>
</filter-set>
```

In alternative embodiment, XML Configuration Access Protocol (XCAP) may be employed for accessing the network component 120 to obtain information about the sessions 160 that includes media types and capabilities of the UAs 101. The network component 120 may store the capabilities of the UAs 101, which may be obtained from media tags in a contact header of for example, a SIP INVITE message (not shown). The media types associated with the sessions 160 may be obtained from a Session Description Protocol (SDP). The network component 120 may produce for example, an XML document with the media type associated with the sessions 160 and the capabilities of the UAs 101. In some embodiments, the document may include or be included in the DIEP state information 170.

In alternative embodiment, XCAP may be employed for accessing the network component 120 to provide the filter for the DIEP state information 170 (instead of the filter being provided in the SUBSCRIBE message) and the notifications may be sent using the SIP notification mechanism and the DIEP.

Figure 2:
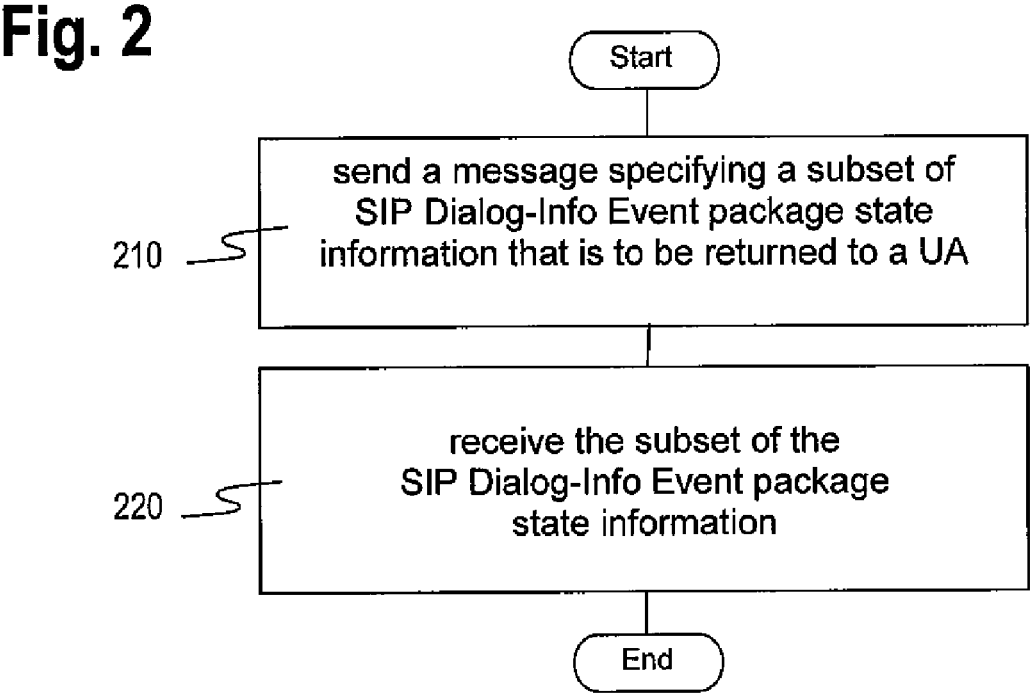
FIG. 2 is a flow chart of a method for a user agent to manage notifications related to session events according to an embodiment of the disclosure.

Turning now to FIG. 2, illustrated is an embodiment of a method for a user agent (UA) to manage notifications related to session events. FIG. 2 is exemplary and other flow charts and procedures could be used. At block 210, a message specifying a subset of Session Initiation Protocol (SIP) Dialog-info Event package state information that is to be returned to the UA is sent. At block 220, the subset of the SIP Dialog-info Event package state information is received.

In some embodiments, a network component is provided that includes a processor configured to receive a first message specifying a subset of Session Initiation Protocol (SIP) Dialog-Info Event package state information, and further configured to transmit a second message that includes the subset of the SIP Dialog-Info Event package state information. The first message may be a SIP SUBSCRIBE message containing a filter specifying the subset of the SIP Dialog-Info Event package state information. The second message may be a SIP NOTIFY message returned to a user agent (UA).

In some cases, the filter specifies at least one dialog/session state for which information is to be obtained and included in the SIP NOTIFY message. In some instances, the filter specifies at least one address of another UA for which SIP Dialog-Info Event package state information is to be obtained and included in the SIP NOTIFY message. The address may be a Uniform Resource Identifier (URI) of the other UA. The address may be a Globally Routable UA URI (GRUU). The SIP NOTIFY message may include a notification of a media type of a session.

In some cases, the filter may specify at least one media handling capability of at least one other UA that has registered at least one of the same URI as the UA but that has a GRUU that is different from the GRUU of UA, information about the media handling capability being included in the SIP Dialog-info Event package state information and being included in the delivered subset of the SIP Dialog-Info Event package state information.

In some cases, the filter may specify a media type currently in use on the at least one other UA, information about the media type being included in the SIP Dialog-Info Event package state information and being included in the delivered subset of the SIP Dialog-info Event package state information.

In some aspects, the first message may be an XCAP (XML (extended markup language) Configuration Access Protocol) message.

Figure 3:
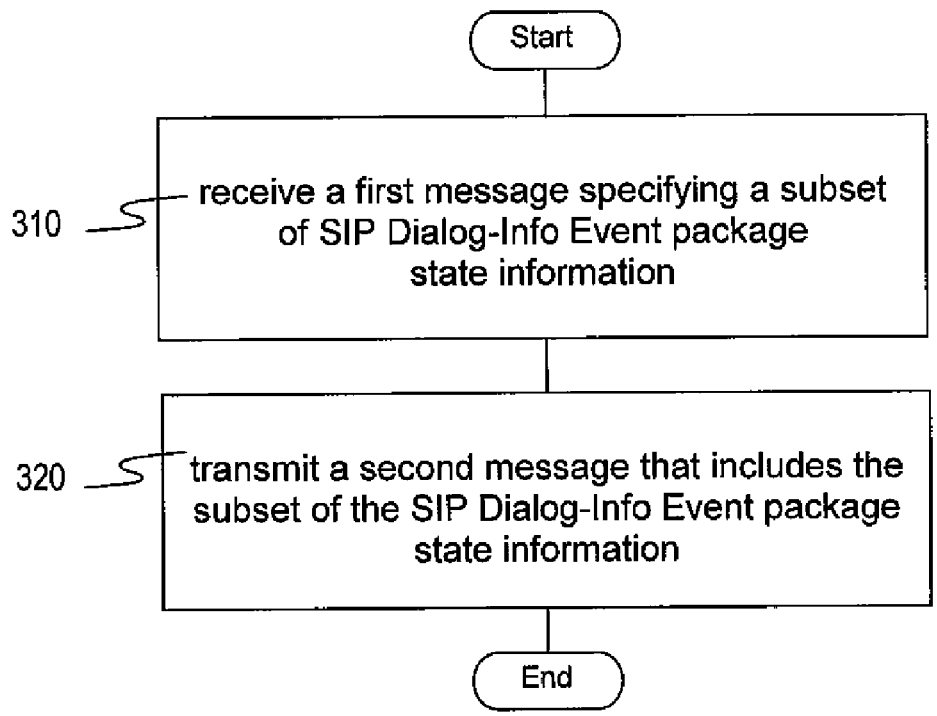
FIG. 3 is a flow chart of a method for a network component to manage notifications related to session events according to an embodiment of the disclosure.

FIG. 3 illustrates an embodiment of a method for a network component to manage notifications related to session events. FIG. 3 is exemplary and other flow charts and procedures could be used. At block 310, a first message specifying a subset of Session Initiation Protocol (SIP) Dialog-Info Event package state information is received. At block 320, a second message that includes the subset of the SIP Dialog-Info Event package state information is transmitted.

Figure 4:
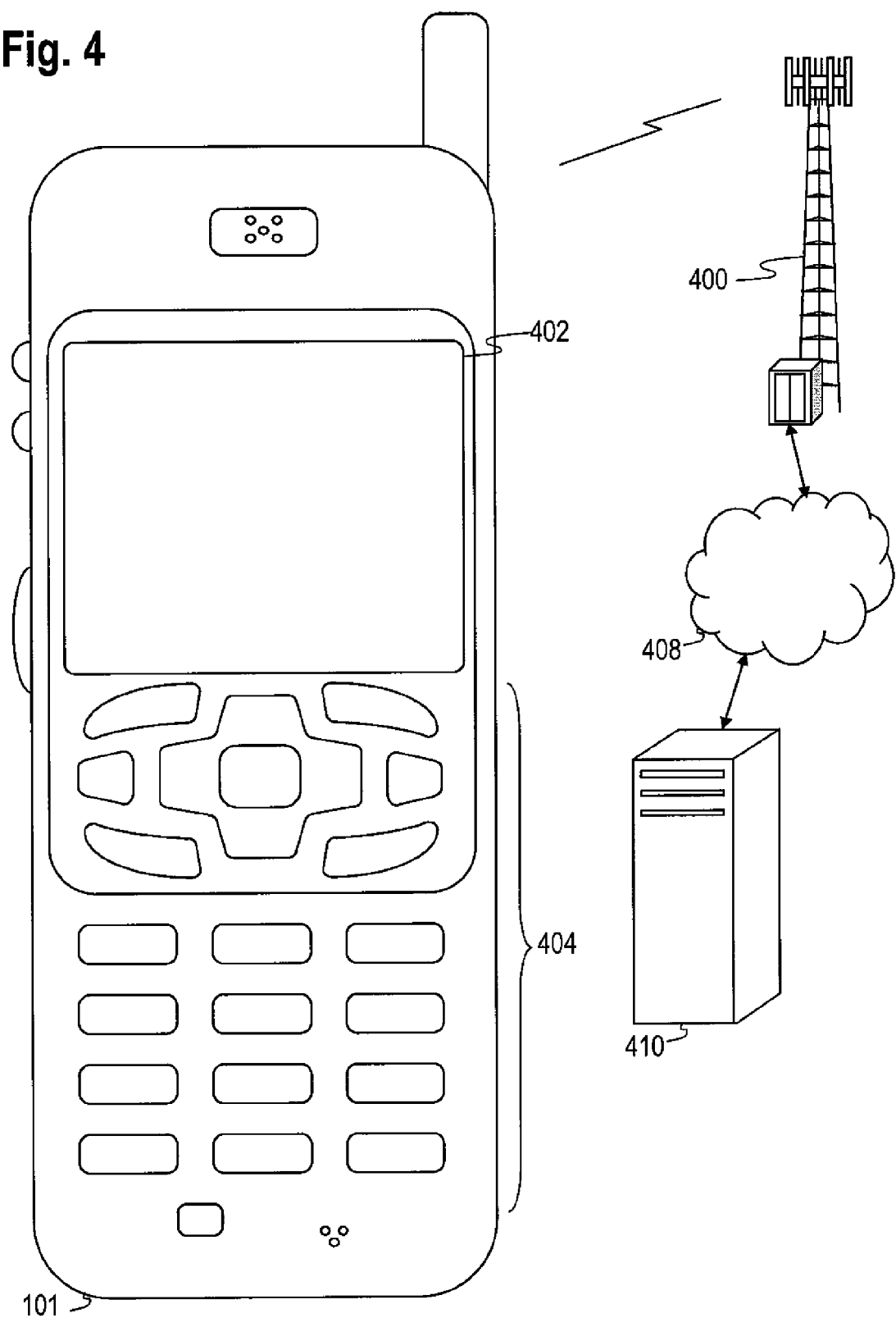
FIG. 4 is a diagram of a wireless communications system including a user agent operable for some of the various embodiments of the disclosure.

FIG. 4 illustrates a wireless communications system including an embodiment of the UAs 101. The UAs 101 are operable for implementing aspects of the disclosure, but the disclosure should not be limited to these implementations. Though illustrated as a mobile phone, the UAs 101 may take various forms including a wireless handset, a pager, a personal digital assistant (PDA), a portable computer, a tablet computer, or a laptop computer. Many suitable devices combine some or all of these functions. In some embodiments of the disclosure, the UA 101 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 101 may be a portable, laptop or other computing device. The UAs 101 may support specialized activities such as gaming, inventory control, job control, and/or task management functions, and so on.

The UAs 101 each include a display 402. The UAs 101 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UAs 101 may present options for the user to select, controls for the user to actuate, and/or cursors or other indicators for the user to direct.

The UAs 101 may further accept data entry from the user, including numbers to dial or various parameter values for configuring the operation of the UAs 101. The UAs 101 may further execute one or more software or firmware applications in response to user commands. These applications may configure the UAs 101 to perform various customized functions in response to user interaction. Additionally, the UAs 101 may be programmed and/or configured over-the-air, for example from a wireless base station, a wireless access point, or a peer UA.

Among the various applications executable by the UAs 101 are a web browser, which enables the display 402 to show a web page. The web page may be obtained via wireless communications with a wireless network access node, a cell tower, a peer UA, or any other wireless communication network or system 400. The network 400 is coupled to a wired network 408, such as the Internet. Via the wireless link and the wired network, the UAs 101 have access to information on various servers, such as a server 410. The server 410 may provide content that may be shown on the display 402. Alternately, the UAs 101 may access the network 400 through a peer UA acting as an intermediary, in a relay type or hop type of connection.

In an embodiment, a graphical user interface (GUI) (not shown) may be presented on the display 402. The GUI may include one or more screens having selections that enable the UAs 101 to input one or more selections for the filters 150a-e into the SIP SUBSCRIBE message 130. For example, the display 402 may show selections for each of the UAs 101, news, video, stocks, text messages, and phone calls that can be selected by the UAs 101. These selections may be associated with, for example, XML elements or instructions that are placed into the filters 150a-e in the SIP SUBSCRIBE message 130. Alternatively, the GUI may include one or more screens having selections that enable the UAs 101 to acknowledge notifications that originate from the SIP NOTIFY message 140.

FIG. 5 shows a block diagram of the UAs 101. While a variety of known components of the UAs 101 are depicted, in an embodiment a subset of the listed components and/or additional components not listed may be included in the UAs 101. The UAs 101 may include a digital signal processor (DSP) 502 and a memory 504. As shown, the UAs 101 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UAs 101 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UAs 101 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UAs 101 to send and receive information from a cellular network or some other available wireless communications network or from a peer UA. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UAs 101 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UAs 101 and may also enable the UAs 101 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UAs 101 to communicate wirelessly with other nearby mobile devices and/or wireless base stations.

The input/output interface 518 may further connect the DSP 502 to the alert 526 that, when triggered, causes the UAs 101 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UAs 101. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UAs 101 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UAs 101 to determine their positions. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the UA hardware with standardized interfaces that are accessible to application software. The operating system drivers 604 include application management services ("AMS") 606 that transfer control between applications running on the UAs 101. Also shown in FIG. 6 are a web browser application 608, a media player application 610, and Java applets 612. The web browser application 608 configures the UAs 101 to operate as web browsers, allowing a user to enter information into forms and select links to retrieve and view web pages. The media player application 610 configures the UAs 101 to retrieve and play audio or audiovisual media. The Java applets 612 configure the UAs 101 to provide games, utilities, and other functionality. A component 614 might provide functionality described herein. Although shown at an application layer, the component 614 might be provided at various layers within the environment 602 or elsewhere on the UAs 101.

Figure 7:
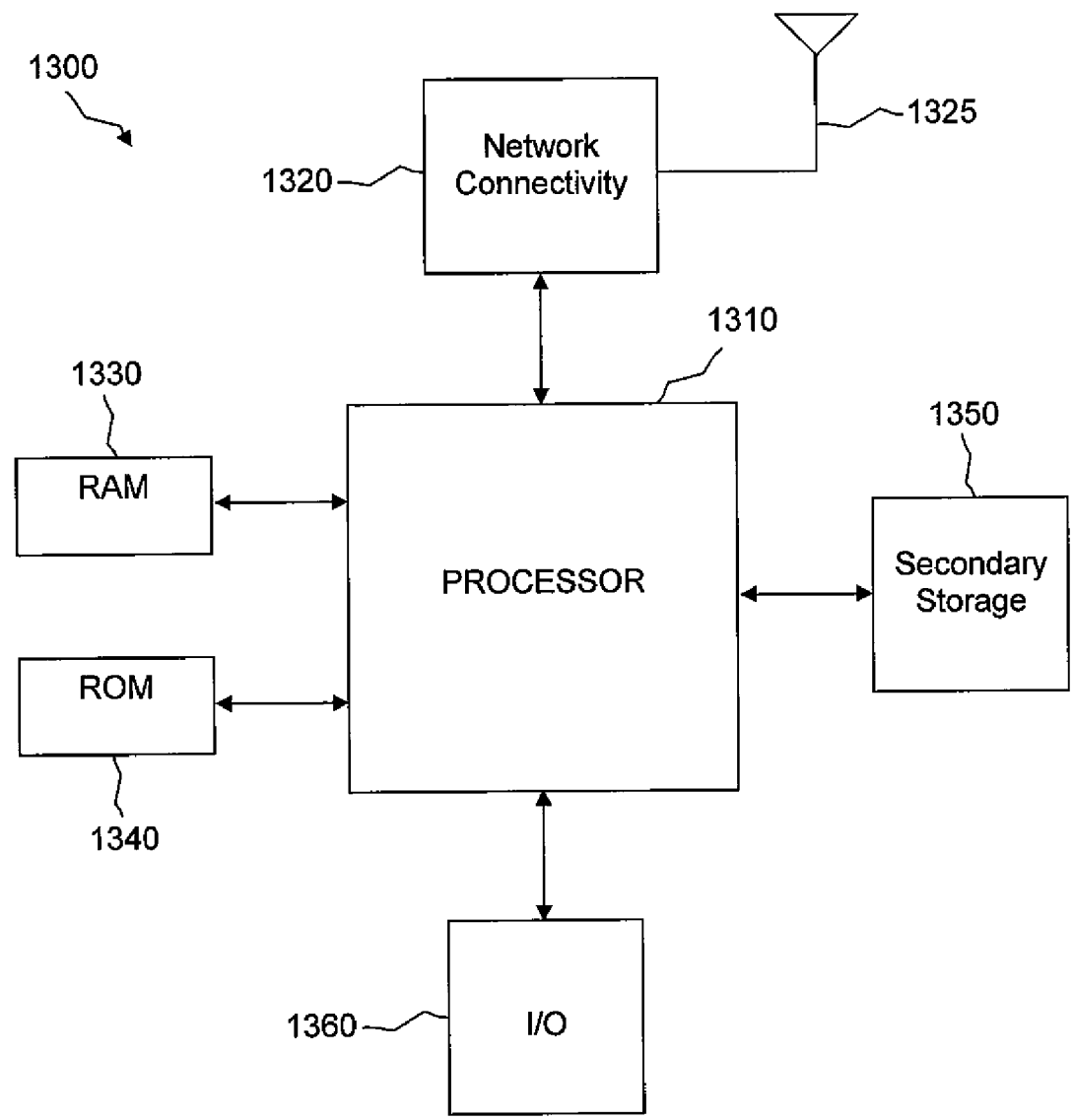
FIG. 7 illustrates an exemplary general-purpose computer system suitable for implementing the several embodiments of the present disclosure.

The UAs 101 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WIMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UAs, such as the display 402 and the input 404.

The following is an example of the reduction in the size and number of notifications that can be achieved through the use of the filtering described herein.

Another aspect is to reduce the unnecessary NOTIFY requests sent.

For example, if a UAC sends an INVITE that looks, in part, like:

---

INVITE sip:alice@example.com;gr=urn:uuid:f81d4fae-7dec-11d0-a765-00a0c91e6bf6
SIP/2.0
Via: SIP/2.0/UDP pc33.example.com;branch=z9hG4bKnashds8
Max-Forwards: 70
To: Alice <sip:alice@example.com>
From: Bob <sip:bob@example.org>;tag=1928301774
Call-ID: a84b4c76e66710
CSeq: 314159 INVITE
Contact: <sip: sip:bob@phone21.example.org >

```
Content-Type: application/sdp
Content-Length: 142
*
v=0                              *
o=bob 53655765 2353687637 IN IP4 pc33.atlanta.com    *
s=Session SDP                    *
t=0 0                            *
c=IN IP4 phone21.example.org     *
m=audio 3456 RTP/AVP 0 1 3 99    *
a=rtpmap:0 PCMU/8000
```

The XML document in a notification from Bob might look like:

```
<?xml version="1.0"?>
<dialog-info xmlns="urn:ietf:params:xml:ns:dialog-info"
             version="0"
             state="full"
             entity="sip:bob@example.org">
<dialog id="as7d900as8" call-id="a84b4c76e66710"
        local-tag="1928301774" direction="-initiator">
<state>trying</state>
        <local>
<identity display="Bob">sip: bob@example.org</identity>
<target uri="sip:bob@phone21.example.org;gr=urn:uuid:f81d4fae-7dec-
11d0-a765-00a0c91e6bf6">
        <param pname="instance" pval="urn:uuid:f81d4fae-
        7dec-11d0-a765-00a0c91e6bf6"/>
        <param pname="audio" pval="true"/>
        <param pname="video" pval="true"/>
    </target>
    <session-description type="audio">
<local>
   <remote>
      <identity display="-Alice">sip:alice@example.com</identity>
      <target uri="sip:alice@example.com "/>
   </remote>
</dialog>
</dialog-info>
```

If the following 180 response is sent

```
SIP/2.0 180 Ringing
Via: SIP/2.0/UDP pc33.example.com;branch=z9hG4bKnashds8
To: Alice <sip:alice@example.com>; tag=456887766
From: Bob <sip:bob@example.com> tag=1928301774;
Call-ID: a84b4c76e66710
CSeq: 314159 INVITE
Contact: <sip:bob@phone21.example.org;gr=urn:uuid:f81d4fae-7dec-
11d0-a765-00a0c91e6bf6>
```

The XML document in a notification might look like:

```
<?xml version="1.0"?>
<dialog-info xmlns="urn:ietf:params:xml:ns:dialog-info"
             version="1"
             state="full"
             entity="sip: bob@example.org ">
<dialog id="as7d900as8" call-id="a84b4c76e66710"
        local-tag="1928301774" remote-tag="456887766"
        direction="initiator">
    <state>early</state>
<local>
    <identity display="Bob">sip:bob@example. org</identity>
    <target uri="sip:bob@phone21.example.org;gr=urn:uuid:f81d4fae-7dec-
11d0-a765-00a0c91e6bf6">
        <param pname="instance" pval="urn:uuid:f81d4fae-7dec-
        11d0-a765-00ac91e6bf6"/>
        <param pname="audio" pval="true"/>
        <param pname="video" pval="true"/>
    </target>
    <session-description type="audio">
</local>
  <remote>
     <identity display="Alice">sip:alice@example.com</identity>
     <target uri="sip:alice@example.com"/>
  </remote>
</dialog>
</dialog-info>
```

If a 200 OK response is sent, the dialog moves to confirmed:

```
<?xml version="1.0"?>
<dialog-info xmlns="urn:ietf:params:xml:ns:dialog-info"
             version="2"
             state="partial"
             entity="sip:bob@example.org">
  <dialog id="as7d900as8" call-id="a84b4c76e66710"
          local-tag="1928301774" remote-tag="hh76a"
          direction="recipient">
    <state>confirmed</state>
  <local>
     <identity display="Alice">sip:alice@example.com</identity>
     <target uri="sip:alice@example.com;gr=urn:uuid:f81d4fae-
7dec-11d0-a765-00a0c91e6bf6">
         <param pname="instance" pval="urn:uuid:f81d4fae-7dec-
         11d0-a765-00a0c91e6bf6"/>
         <param pname="audio" pval="true"/>
         <param pname="video" pval="true"/>
     </target>
     <session-description type="audio">
  <local>
  <remote>
      <identity display="Bob">sip:bob@example.org</identity>
      <target uri="sip:bob@phone21.example.org"/>
  </remote>
</dialog>
</dialog-info>
```

Instead the following single NOTIFY Body is sent as a result of a Filter:

```
<?xml version="1.0" encoding="UTF-8"?>
<dialog-info xmlns="urn:ietf:params:xml:ns:dialog-info"
    xmlns:xsi="http://www.w3.org/2001/XMLSchema-instance"
    xsi:schemaLocation="urn:ietf:params:xml:ns:dialog-info"
    version="1" state="partial">
  <dialog id="123456">
    <state>trying</state>
    <local>
       <session-description type="audio">
    </local>
  </dialog>
</dialog-info>
```

As can be seen in the above example the single SIP NOTIFY body which is much reduced in size replaces all the additional SIP NOTIFY requests that would have been sent without the filter. Subscribing using a GRUU in the request URI of the SUBSCRIBE to Subscribe to the device state instead of knowing what the dialog is a practical solution that enables one device of a user to subscribe to the device state of another before the dialog is established. Subscribing to a GRUU scopes the subscription to a single device rather than all the devices of the user.

The embodiments are applicable to both real time sessions (such as phone calls and multimedia sessions) and messaging sessions of various media types.

An alternative solution is using XCAP to access the server and obtain information from the server about the sessions (including the Media Types and the capabilities of the terminal). The server would need to store for each device the capabilities of the device (obtained from the media feature tags in the contact header of the SIP INVITE) and the media types associated with the session obtained from the SDP. The server then produces an XML document with this information and the user can obtain this document containing the list of sessions and media types of those sessions and the capabilities of the devices using XCAP.

The following IETF RFCs are incorporated herein by reference: [RFC 3261] SIP: Session Initiation Protocol, [RFC 3265] Session Initiation Protocol (SIP)-Specific Event Notification, [RFC 3680] Registration event package, [RFC 4235] An INVITE-Initiated Dialog Event Package for SIP, [RFC 4660] Functional Description of Event Notification Filtering, [RFC 4661] XML-Based Format for Event Notification Filtering, [RFC 4825] The XML Configuration Access Protocol (XCAP), [draft-ieff-sip-gruu] GRUU, and [draft-ieff-simple-partial-notify] Partial Notification of Presence Information.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A first user agent (UA) comprising:
a processor configured to send a first message specifying a subset of Session Initiation Protocol (SIP) Dialog-Info Event package state information that is to be returned to the first UA, wherein the message is a SIP SUBSCRIBE message containing a filter specifying the subset of the SIP Dialog-Info Event package state information, and wherein the filter specifies at least one capability of at least one other UA that has registered at least one of the same Uniform Resource Indicators (URIs) as the first UA but that has a Globally Routable UA URI (GRUU) that is different from the GRUU of the first UA, information about the capability being included in the SIP Dialog-Info Event package state information and being included in the delivered subset of the SIP Dialog-Info Event package state information.

2. The first UA of claim 1, wherein the filter specifies a media type currently in use on the at least one other UA, information about the media type being included in the SIP Dialog-Info Event package state information and being included in the delivered subset of the SIP Dialog-Info Event package state information.

3. A method implemented by a first user agent (UA) comprising a processor, the method to manage notifications related to session events, the method comprising:
sending a message specifying a subset of Session Initiation Protocol (SIP) Dialog-Info Event package state information that is to be returned to the first UA; and
receiving the subset of the SIP Dialog-Info Event package state information;
wherein the message is a SIP SUBSCRIBE message containing a filter specifying the subset of the SIP Dialog-Info Event package state information; and
wherein the filter specifies at least one media handling capability of at least one other UA that has registered at least one of the same Uniform Resource Indicator (URI) as the first UA but that has a Globally Routable UA URI (GRUU) that is different from the GRUU of the first UA, information about the media handling capability being included in the SIP Dialog-Info Event package state information and being included in the delivered subset of the SIP Dialog-Info Event package state information.

4. The method of claim 3, wherein the filter specifies a media type currently in use on the at least one other UA, information about the media type being included in the SIP Dialog-Info Event package state information and being included in the delivered subset of the SIP Dialog-Info Event package state information.

5. A method implemented by a network component comprising a processor, the method to manage notifications related to session events, the method comprising:
receiving a first message specifying a subset of Session Initiation Protocol (SIP) Dialog-Info Event package state information; and
transmitting a second message that includes the subset of the SIP Dialog-Info Event package state information;
wherein the first message is a SIP SUBSCRIBE message containing a filter specifying the subset of the SIP Dialog-Info Event package state information;
wherein the filter specifies at least one session event notification that is included in the SIP Dialog-Info Event package state information that is to be included in the delivered subset of the SIP Dialog-Info Event package state information; and
wherein the filter specifies at least one media handling capability of at least one user agent (UA) that has registered at least one of the same Uniform Resource Indicator (URI) as a second UA but that has a Globally Routable URI UA (GRUU) that is different from the GRUU of the second UA, information about the media handling capability being included in the SIP Dialog-Info Event package state information and being included in the delivered subset of the SIP Dialog-Info Event package state information.

6. The method of claim 5, wherein the filter specifies a media type currently in use on the at least one UA, information about the media type being included in the SIP Dialog-Info Event package and being included in the delivered subset of the SIP Dialog-Info Event package state information.

7. The first UA of claim 1, wherein the at least one capability comprises a media handling capability.

8. The first UA of claim 1, wherein the at least one capability is obtained from a media tag in a contact header.

9. The method of claim 3, wherein the at least one media handling capability comprises a streaming video handling capability.

10. The method of claim 3, wherein the at least one media handling capability is obtained from at least one media tag in a contact header.

11. The method of claim 4, wherein the media type is one of text, audio, and video.

12. The method of claim 5, wherein the at least one session event notification comprises information on a media type added to the session, wherein the media type is associated with a UA that has registered at least one of the same URI as the second UA but that has a GRUU that is different from the GRUU of the second UA.

13. The method of claim 12, wherein the media type may be obtained from a Session Description Protocol (SDP).

* * * * *

UNITED STATES PATENT AND TRADEMARK OFFICE
CERTIFICATE OF CORRECTION

PATENT NO. : 8,028,074 B2  
APPLICATION NO. : 12/209900  
DATED : September 27, 2011  
INVENTOR(S) : Andrew Allen Page 1 of 1

It is certified that error appears in the above-identified patent and that said Letters Patent is hereby corrected as shown below:

Title Page, Item (73) Assignee, Replace "Waterlook" with – "Waterloo"

Signed and Sealed this  
First Day of January, 2013

David J. Kappos  
*Director of the United States Patent and Trademark Office*